3,301,403
FILTER ASSEMBLY FOR SHALLOW WELL INTAKES
Francis R. Reminder, Spring Lake, Mich., assignor to Tri-City Manufacturing Company, Grand Haven, Mich.
Filed Dec. 9, 1964, Ser. No. 416,979
4 Claims. (Cl. 210—253)

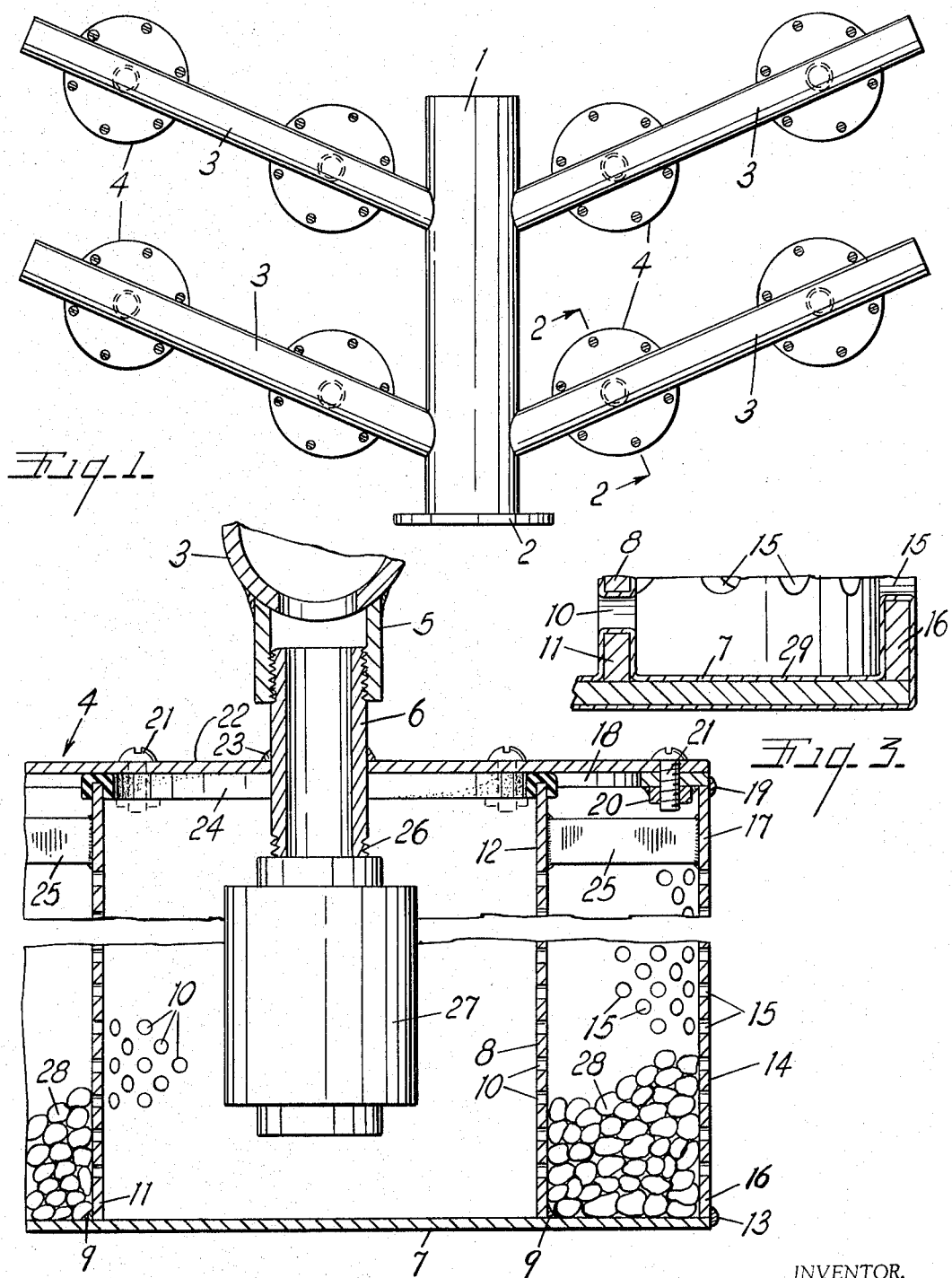

This invention relates to filter assembly for shallow well intakes. The principal objects of this invention are:

First, to provide a filter assembly which may be assembled in multiple arrangements of separate filters for filtering out coarse matter than commonly collects in subsurface water found a short distance below the ground level such as around lakes and other low or marshy places, or placed directly in lakes or ponds.

Second, to provide a filter assembly which is relatively easy to disassemble for cleaning and renewing of the filtering media.

Third, to provide a filter unit which is long lived and which will effectively separate vegetable matter from the water and prevent it clogging the pump drawing water through the filter.

Fourth, to provide a filter unit particularly for the intake of lawn sprinkler systems which will collect water at a short distance below ground level without permitting roots or other fibrous material from reaching the pump of the system.

Other objects and advantages of the invention will be apparent from a consideration of the following description and claims. The drawings of which there is one sheet illustrate a highly practical form of the filter system and the individual filter units thereof.

FIG. 1 is a top plan view of the filter assembly.

FIG. 2 is a fragmentary cross sectional view taken along the plane of the line 2—2 in FIG. 1.

FIG. 3 is an enlarged fragmentary cross sectional view through the bottom of one of the filter units.

In water systems particularly those used for furnishing sprinkling water to lawns around cottages and other buildings located on low ground or near lakes or marshes, water is readily available a short distance below ground level but is apt to be heavily loaded with vegetable matter such as root fragments which will clog the pump of the water system if permitted to reach the pump. The present filter system effectively prevents such foreign matter from reaching the pump. The system is inexpensive and easily installed and may be easily reconditioned by removing the several filter units and recharging the filtering media as is necessary. As appears in FIG. 1 the system consists of a main intake pipe 1 of suitable capacity having a flange 2 for connection to the intake of the pump. Extending angularly from the sides of the main intake pipe are a plurality of branch intake pipes 3. It will be appreciated that the intake pipes are made as long or as many as is necessary to satisfy the demands of the pump. Each branch intake pipe 3 has a plurality of filter units generally designated by numeral 4 removably connected thereto. The filter units and their connection to the intake system are identical so a description of one will suffice.

Each branch intake pipe 3 has a plurality of downwardly extending connecting pipes 5 which are threaded to receive the externally threaded nipples 6 projecting upwardly from the filter units 4. The filter unit consists of a lower imperforate circular metal plate 7 having an inner cylindrical wall or screen 8 secured thereto as by welding at intervals as at 9. The material forming the wall 8 is uniformly perforated metal having circular holes 10 formed in staggered relation around its surface.

A band 11 of unperforated metal extends around the bottom of the cylinder as does a band of imperforate metal 12 at the upper end of the cylinder. The cylinder is welded in radially inwardly spaced relation from the edge of the bottom plate 7.

Secured to the outer periphery of the bottom plate as by welding at 13 is an outer perforate cylinder 14 having a plurality of staggered holes 15 formed therethrough. A band of imperforate metal 16 extends around the bottom of the outer cylinder and an imperforate band 17 extends around the top of the cylinder. The inner cylinder 8 and the outer cylinder 14 are of approximately equal height.

Secured around the upper edge of the outer cylinder 14 and projecting radially inwardly therefrom is a cover mounting ring 18 secured at intervals by welding as at 19 to the outer cylinder. The under side of the flange 18 carries a series of nuts 20 welded to its under side to receive screws 21 passed through a removable cover plate 22 through which the nipple extends and to which the nipple is welded as at 23. The upper edge of the inner cylinder 8 carries a U-shaped deformable rubber gasket 24 to seal against the bottom of the cover plate should there be any deflection or warping of the bottom plate as the result of forming the welds 9.

The upper end of the inner cylinder 8 is braced and spaced from the outer cylinder 14 at intervals by struts 25 welded between the two cylinders. The lower end of the nipple 6 within the inner cylinder is threaded as at 26 to receive a standard foot valve 27 through which water enters the intake system from within the inner cylinder. Before installation of the filter unit 4 the annular space between inner cylinder 8 and the outer cylinder 14 is filled with small stones or pea gravel as at 28 and water flowing through the outer cylinder is filtered over the stones to separate out roots and fibrous matter and other large impurities in the surface water.

With particular reference to FIG. 3 it will be noted that the body of the filter unit 4 including the bottom plate 7, the inner cylinder 8 and the outer cylinder 14 is provided with a continuous vitreous coating 29 which protects the metal of the filter unit from rust. The cover plate 22 may be similarly coated with vitreous material but naturally the nipple 6 and particularly its threaded ends are not covered with the vitreous coating.

The filter system as a whole is easily maintained as it is possible to uncover one of the filter units 4 and unscrew is from its branch pipe 3 for recharging the filtering gravel 28. The intake neck 5 is closed when the filter unit is removed so that the system can continue to operate from the remaining filter units as each successive unit is removed and emptied of clogged or dirty gravel and refilled with fresh gravel.

What is claimed as new is:
1. A filter system comprising
   a main intake pipe with branch intake pipes opening therefrom and having downwardly projecting filter connections spaced along the branch pipes,
   a filter unit secured to each of said filter connections and comprising a cylindrical outer wall and a cylindrical inner wall secured in radially spaced relation to a bottom wall,
   said inner and outer walls being perforate with imperforate bands along their upper and lower edges,
   a cover retaining ring secured to the upper edge of said outer wall and projecting inwardly therefrom,
   nuts secured to the under side of said ring,
   a removable cover plate secured over said inner and outer walls and secured thereto by screws engaged with said nuts, a deformable gasket fitted over the upper edge of said inner wall and bearing against said cover plate, a nipple secured in the center of said cover plate and adapted at its upper end for engagement with the filter connection of said branch pipes and adapted at its inner end for connection to a foot valve, and a coating of vitreous enamel covering said inner, outer and bottom walls and said cover plate, the space between said inner and outer walls and said bottom wall and cover plate being adapted to be filled with pea size gravel.

2. A filter system comprising a main intake pipe with branch intake pipes opening therefrom and having downwardly projecting filter connections spaced along the branch pipes, a filter unit secured to each of said filter connections and comprising a cylindrical outer wall and a cylindrical inner wall secured in radially spaced relation to a bottom wall, said inner and outer walls being perforate, a cover retaining ring secured to the upper edge of said outer wall and projecting inwardly therefrom, nuts secured to the under side of said ring, a removable cover plate secured over said inner and outer walls and secured thereto by screws engaged with said nuts, a deformable gasket fitted over the upper edge of said inner wall and bearing against said cover plate, a nipple secured in the center of said cover plate and adapted at its upper end for engagement with the filter connection of said branch pipes and adapted at its inner end for connection to a foot valve, and a coating of vitreous enamel covering said inner, outer and bottom walls and said cover plate, the space between said inner and outer walls and said bottom wall and cover plate being adapted to be filled with pea size gravel.

3. A filter unit comprising a cylindrical outer wall and a cylindrical inner wall secured in radially spaced relation to a bottom wall, said inner and outer walls being perforate with imperforate bands along their upper and lower edges, a cover retaining ring secured to the upper edge of said outer wall and projecting inwardly therefrom, nuts secured to the under side of said ring, a removable cover plate secured over said inner and outer walls and secured thereto by screws engaged with said nuts, a deformable gasket fitted over the upper edge of said inner wall and bearing against said cover plate, a nipple secured in the center of said cover plate and adapted at its upper end for engagement with a pump intake pipe and adapted at its inner end for connection to a foot valve, and a coating of vitreous enamel covering said inner, outer and bottom walls and said bottom and cover plate.

4. A filter unit comprising a cylindrical outer wall and a cylindrical inner wall secured in radially spaced relation to a bottom wall, said inner and outer walls being perforate, a cover retaining ring secured to the upper edge of said outer wall and projecting inwardly therefrom, a removable cover plate secured over said inner and outer walls and secured thereto by screws engaged with said ring, a deformable gasket fitted over the upper edge of said inner wall and bearing against said cover plate, a nipple secured in the center of said cover plate and adapted at its upper end for engagement with a pump intake pipe and adapted at its inner end for connection to a foot valve, and a coating of vitreous enamel covering said inner, outer and bottom walls and said bottom and cover plate.

No references cited.

SAMIH N. ZAHARNA, *Primary Examiner.*